Figure 1:
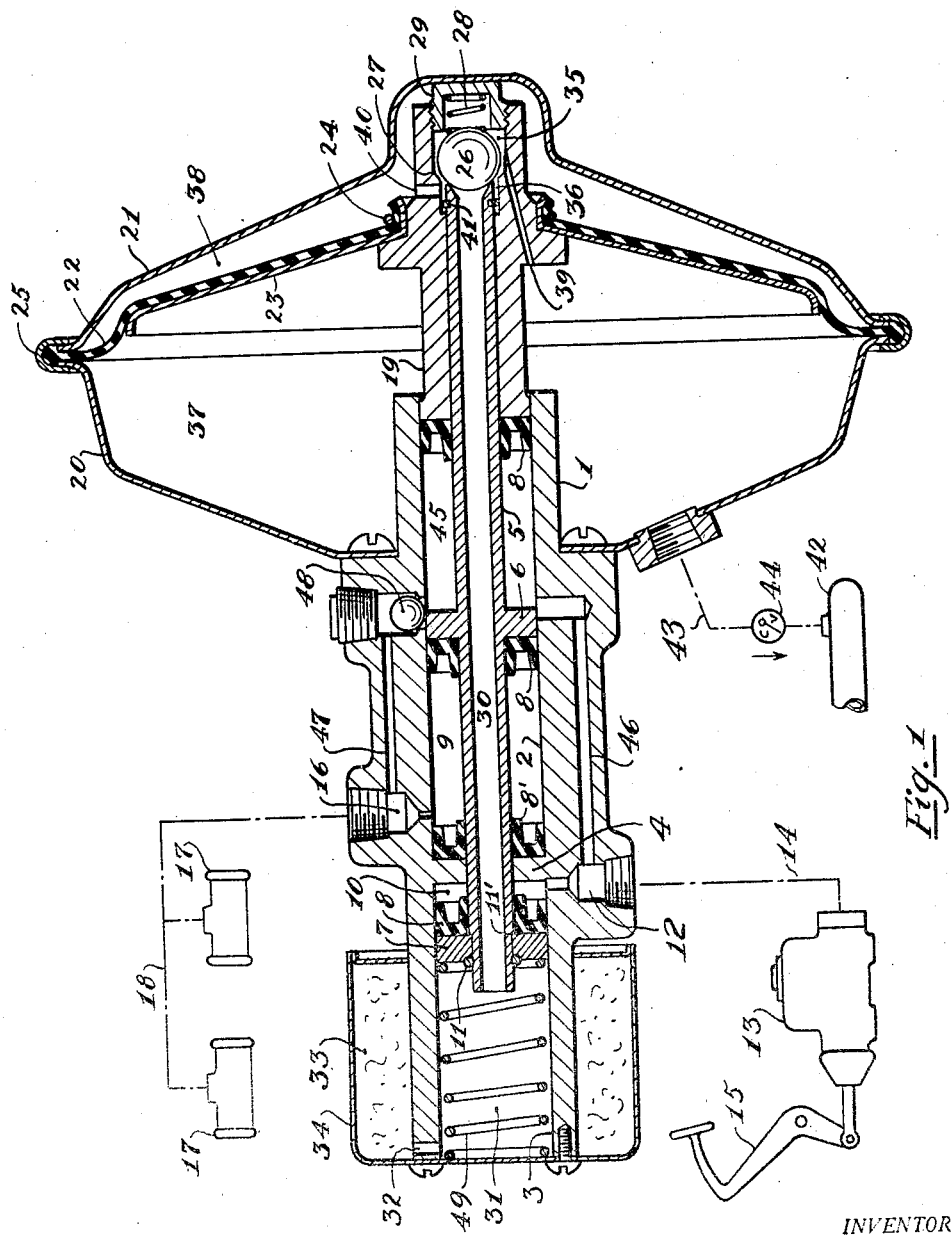

June 11, 1946.                    W. STELZER                    2,401,892
                            BOOSTER BRAKE MECHANISM
                            Filed Aug. 24, 1944          2 Sheets-Sheet 1

INVENTOR.
William Stelzer
By
ATTORNEY

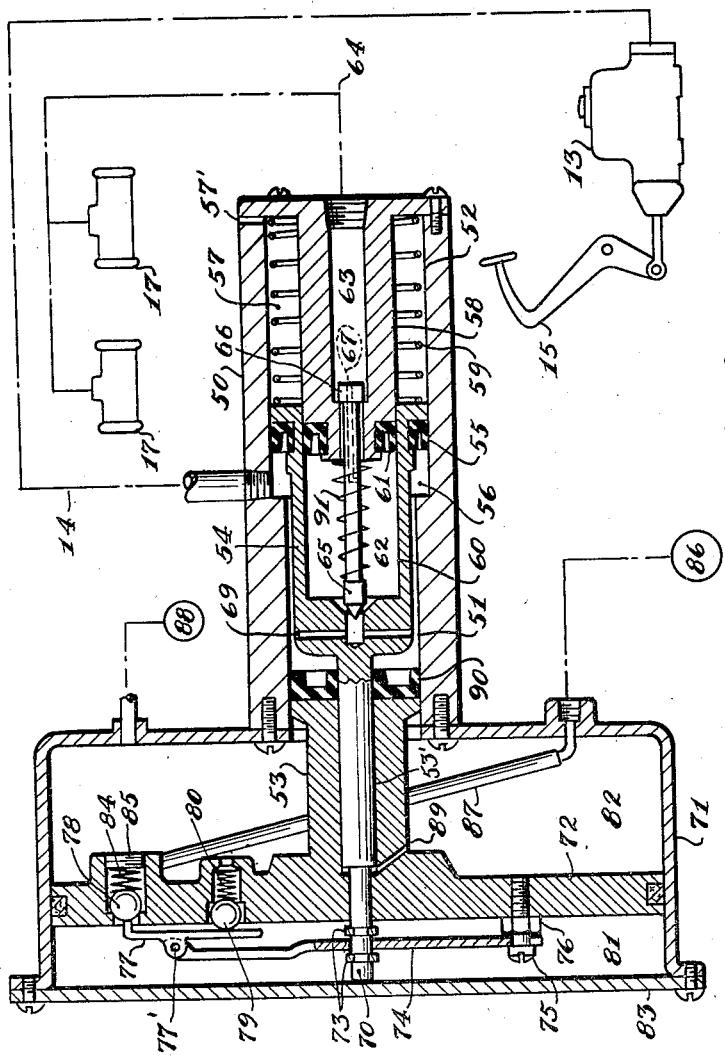

Patented June 11, 1946

2,401,892

UNITED STATES PATENT OFFICE 2,401,892

BOOSTER BRAKE MECHANISM

William Stelzer, East Orange, N. J.

Application August 24, 1944, Serial No. 551,013

10 Claims. (Cl. 60—54.5)

This invention relates to hydraulic brake boosters of the type wherein the booster unit is connected in the line from the master cylinder to the wheel cylinders of a motor vehicle.

In most devices of the type referred to, it has become the general practice to provide a booster mechanism of such construction that a substantial braking pressure is supplied to the wheel cylinders, such pressure being the sum of the foot-generated pressure in the master cylinder and hydraulic pressure generated by a fluid pressure operated motor, thus providing substantial braking pressure while relieving the operator of a substantial part of the work.

An important object of the present invention is to provide a novel booster brake mechanism wherein all of the work is performed by the operator in such a manner as to provide relatively high braking pressures while minimizing the effort required by the operator, and without displacing more than the conventional amount of braking fluid from the master cylinder.

A further object is to provide such an apparatus wherein the fluid pressure motor employed serves merely to displace braking fluid to minimize the amount of fluid which must be displaced from the master cylinder to result in the building up of substantially higher braking pressures than can be generated by the operator with a given brake pedal pressure and with a conventional displacement of fluid from the master cylinder.

A further object is to provide such a device wherein a relatively high braking pressure is effected solely by the operator through the provision of a boosting mechanism which gives a hydraulic advantage to the brake pedal effort, thus permitting the manual generation of braking force substantially in excess of the manually generated pressure in the master cylinder.

A further object is to provide such an apparatus wherein a more sensitive reaction occurs than can be obtained with other devices of this general type, for the reason that the reaction surfaces are inherently larger so that friction losses in the various elements are smaller in percentage, thus having less influence on the smooth operation of the booster.

A further object is to provide an improved valve operating means for the fluid pressure operated motor employed whereby an extremely rapid response of the motor to operation of the brake pedal is provided, movements of the control valves being greatly multiplied with respect to initial movements of the brake pedal.

Other objects and advantages of the invention will become apparent during the course of the following description.

In the drawings I have shown two embodiments of the invention. In this showing:

Figure 1 is a central longitudinal sectional view through the booster unit, the master cylinder, two of the wheel cylinders and the source of partial vacuum for operating the motor being diagrammatically represented, and Figure 2 is a similar view showing a modified form of the invention.

Referring to Figure 1, there is shown a booster unit comprising a cylinder body 1 having bores 2 and 3 therein separated by a partition 4 having a central opening to accommodate a hollow piston rod 5 carrying pistons 6 and 7. Each of these pistons is provided with seals 8 sliding in the respective bores 2 and 3. A stationary seal 8' is arranged against the partition 4 in the bore 2 and serves to prevent leakage of fluid from the chamber 9, formed between the partition 4 and piston 6, to the chamber 10, defined by the partition 4 and the piston 7. The piston rod 5 slides through the inner lip of the seal 8'.

The piston 7 is preferably secured to the hollow rod 5 by means of a snap ring 11 to facilitate assembly. As shown, the hollow rod 5 is preferably slightly shouldered as at 11' to prevent sliding movement of the piston 7 away from the ring 11. The chamber 10 is ported as at 12 for communication with the master cylinder 13 through the line 14. The master cylinder is operable by a conventional foot pedal 15, and the master cylinder is provided with the usual piston (not shown) for generating a primary hydraulic pressure upon operation of the brake pedal 15.

The secondary or boosted hydraulic pressure is generated in the chamber 9 which is ported as at 16 for communication with the conventional wheel cylinders or brake actuators 17 through suitable lines 18.

A power piston 19 slidably surrounds the hollow rod 5 and is reciprocable in the right hand end of the bore 2 as viewed in Figure 1. The power piston is operable by an expansible chamber motor mechanism comprising a pair of housing shells 20 and 21, the former of which is anchored to the piston body 1 as shown. A diaphragm 22 is interposed between the shells 20 and 21 and is arranged against and supported by a diaphragm plate 23 pressed on or otherwise firmly secured to the power piston 19. A snap ring or wire 24 secures the inner periphery of the diaphragm to the plate 23, the outer periphery of the diaphragm being clamped between the shells 20 and 21 by a clamping ring 25 which obviously serves also to secure the shells 20 and 21 to each other.

One end of the piston 19 is provided with a valve mechanism for controlling the operation of the motor. The valve mechanism comprises a ball 26 urged against a seat 27, formed in the end of the piston 19, by a spring 28 arranged in a cap 29 threaded in the adjacent end of the piston 19. The ball 26 also seats against the adjacent end of the hollow rod 5 to close off the air passage 30 through the piston 5, such passage communicating with the atmosphere through a chamber 31, opening 32 and air cleaner or filter 33, of which the cover 34 is a part. The stepped bores in the piston 19 which form the valve seat 27 also form chambers 35 and 36 on opposite sides of the ball 26, and these chambers are respectively in communication with the motor chambers 37 and 38, on opposite sides of the diaphragm 22, through passages 39 and 40. The end of the hollow rod 5 adjacent the ball 26 carries a snap ring 41 to limit movement of the rod 5 relative to the power piston 19 toward the left as viewed in Figure 1. Movement of the rod 5 in the opposite direction is arrested by the ball 26 when the latter comes into contact with the cap 29.

The motor mechanism utilizes differential pressure between the atmosphere and a source of vacuum, as indicated by the numeral 42, connected to the chamber 37 by a line 43 in which a check valve 44 is preferably interposed. The source of vacuum 42 is preferably the intake manifold of the motor vehicle engine. It will be apparent that the motor mechanism may be operated by superatmospheric pressure, in which case the line 43 will be connected to the atmosphere and the chamber 31 to a source of superatmospheric pressure.

The pressure produced by the power piston 19 operates against fluid in the chamber 45 between the pistons 6 and 19, and the chamber 45 is in communication at all times with the chamber 10 and master cylinder 13 through a passage 46 formed in the cylinder body 1. Another passage 47 affords communication between the chamber 45 and chamber 9 and wheel cylinders 17, and a check valve 48 is so arranged in this passage as to be lifted by the piston 6 when the latter is in the retracted position shown in Figure 1. This piston and its associated elements are urged to the retracted position by a return spring 49 in the chamber 31.

In the modified form of the invention shown in Figure 2, the booster unit comprises a cylinder body 50 having bores 51 and 52 therein and pistons 53 and 54 are respectively slidable in these bores. The piston 53 is power operated, as will be referred to later. The piston 54 is provided with a seal 55 engaging the wall of the bore 52 to prevent leakage of fluid from the chamber 56, to the left of the seal 55, into the chamber 57, formed by the left hand end of the bore 52. A stationary plunger 58 is secured to the cylinder body 51 as shown and a spring 59 is arranged in the chamber 57 to urge the piston 54 toward its "off" or retracted position shown in Figure 2. The stationary plunger 58 is secured to the piston body 50 in such a manner as to permit breathing of the chamber 57 upon movement of the piston 54, this being accomplished, for example, by grooving the end of the piston body 50 as at 57'.

The piston 54 is provided with a bore 60 in which the stationary plunger 58 is relatively slidable upon movement of the piston 54, and a seal 61 prevents leakage from the chamber 62 past the stationary plunger 58. The chamber 62 is the high pressure chamber of the mechanism and is in communication with the wheel cylinders 17 through a passage 63 in the stationary plunger 68 and a line 64 leading to the brake cylinders 17. A needle valve 65 is adapted to be unseated when the booster is in the retracted position shown, and for this purpose the needle valve is provided with a collar or shoulder 66 engageable with the shoulder shown as being formed in the passage 63. It is preferable that the collar 66 does not seal communication between the passage 63 and chamber 62, and accordingly a passage 67 is formed in the stem of the needle valve 65 so that fluid may flow freely between the chamber 62 and passage 63. The seal 61 is secured to the plunger 58 to slide in the bore 60. The needle valve 65 is urged toward its seat in the inner end of the bore 60 by a light spring 91. The needle valve controls communication between the chambers 56 and 62 through passages 69. The chamber 56 is the low pressure chamber and communicates with the master cylinder 13 through line 14.

The power piston 53 has an axial bore 53' through which passes a piston rod 70 extending from the piston 54 to operate the valves of the motor mechanism. Such mechanism comprises a cylinder 71 in which a piston 72 is slidable, this piston being a part of the power piston 53 and moving in unison therewith. The rod 70 carries a pair of snap rings 73 engaging a valve operating lever 74. This lever extends diametrically across the axis of the motor and has one end mounted between a screw 75 and nut 76 to act as a fulcrum for the lower end of the lever 74 as viewed in Figure 2. The other end of the lever 74 is pivotally connected to a lever 77 intermediate the ends thereof as at 77'. The lever 77 forms a double-armed pivoted beam and the respective ends of such beam engage valve balls 78 and 79. The valve 79 is urged away from its seat by a spring 80 to provide communication between the motor chambers 81 and 82 on opposite sides of the piston 72. The motor chamber 81 is closed to the atmosphere by a cover plate 83. The valve ball 78 is urged toward its seat by a spring 84 retained by a threaded plug 85. The bore in which the spring 84 is mounted is in communication with a source of fluid pressure 86 through a flexible closed connection 87. The motor chamber 82 is connected to a source of low pressure 88. It is immaterial whether the source 88 is the atmosphere or a source of subatmospheric pressure. In the former case, the source 88 would be super-atmospheric pressure and in the latter case, the atmosphere. Preferably, the numeral 86 designates a source of atmospheric pressure, and the numeral 88 the intake manifold of the motor vehicle engine. The only difference in the use of super-atmospheric pressure lies in the necessity for a vent 89 in the power piston 53 to prevent the entrance of air into the hydraulic system past the piston seal 90.

The operation of the form of the invention shown in Figure 1 is as follows:

Assuming that the booster is in released or "off" position, depression of the brake pedal by the operator to apply the brakes produces a hydraulic pressure in the line 14, and fluid flows through passage 46, chamber 45, past ball 48, through passage 47 and line 18 to the wheel cylinders 17 to move the brake shoes into engagement with the brake drums. The hydraulic pressure is also communicated directly through port 12 into the chamber 10 and through port 16 into the chamber 9. As soon as the brake shoes engage the drums, pressure immediately increases in the chambers 9, 10 and 45, and pressure in the chamber 10 overcomes the compression of the spring 49 and moves the hollow rod 5 toward the left as viewed in Figure 1. This moves the right hand end of the rod 5 from the ball 26. The rod 5 will have previously held the ball 26 from its seat 27, thus connecting the chambers 35 and 36 and affording communication between the motor chambers 37 and 38. The motor thus will have been "vacuum suspended." Movement of the rod 5 toward the left results in the ball 26 engaging the seat 27 to disconnect the chambers 35 and 36 and to open the chamber 36 to the atmosphere through the passage 30. Air flows through passage 40 into the motor chamber 38 to move the diaphragm 22, plate 23 and piston 19 toward the left.

As previously stated, the building up of pressure in the chamber 10 moves the piston 7 toward the left and the piston 6 similarly moves to the left. The energization of the motor causes the piston 19 to move into the chamber 45 to follow-up with respect to the piston 6, any tendency for the piston 19 to advance too far resulting in the seating of the ball 26 on the end of the rod 5 to prevent further movement of air into the motor chamber 38. The volume in the chamber 45 thus remains relatively constant, while the foot-generated fluid pressure in the chambers 45 and 10 act on the pistons 6 and 7 to displace fluid from the chamber 9 into the brake cylinders. As soon as the piston 6 passes the ball 48 the latter closes so that a higher pressure is permitted to be built up in the brake lines leading to the brake cylinders.

During the working strokes of the pistons 6 and 7, that is, after the ball 48 is seated, the manually produced or primary pressure in chambers 10 and 45 acts on pistons 7 and 6 respectively to produce an increased pressure in chamber 9. The action is the same as that of a simple compounding piston where the displacement of a large amount of fluid affects the displacement of a smaller amount of fluid under a correspondingly higher pressure. In the present case, it is unnecessary to displace a great amount of fluid in order to generate a higher pressure since the movement of the piston 6 by primary pressure in the chamber 45 is effected without the actual entrance of fluid into this chamber by reason of the follow-up action of the power piston 19.

Assuming the bores 2 and 3 to be of equal diameter and neglecting the effect of the spring 49 and the friction of the sealing cups 8 and 8', the booster ratio obtained with the compounding piston mechanism would be exactly 2:1, i. e., the hydraulic pressure transmitted to the vehicle cylinders would be twice that produced by the master cylinder. Such a manual pressure booster would be ideal to maintain a predetermined booster ratio, but without the functioning of the fluid pressure motor, the present device, as illustrated, would require the displacement from the master cylinder of twice the fluid displaced from the chamber 9 into the brake cylinders to effect the braking operation. With the present arrangement, the bores 2 and 3 can be of exactly the same cross-sectional area as the wheel cylinders 17 and the piston of the master cylinder, in which case, the amount of fluid flowing into the brake cylinders will exactly equal the amount of fluid displaced from the master cylinder. The volume of the chamber 45 remains constant because of the motor follow-up action, and accordingly the master cylinder is called upon only to displace fluid at a rate sufficient to make up for the increased capacity of the chamber 10 as the brakes are applied, and this increased capacity corresponds exactly with the decreasing capacity of the chamber 9 during brake application.

Upon the releasing of the brake pedal 15 and the consequent relieving of pressure in the chambers 10 and 45, the existing pressure in the chamber 9 urges the compounding pistons 6 and 7 toward the right so that the rod 5 engages the ball 26 to disconnect the air passage 30 from the chamber 36 and to disengage the ball 26 from the seat 27 to reestablish communication between the motor chambers 37 and 38. Air previously admitted into the chamber 38 will flow through passage 40 into chamber 36, then into chamber 35 and through passage 39 into the chamber 37 to be exhausted through the line 43, balanced pressures thus being reestablished in the motor. As the parts approach the released positions, the piston 6 unseats the ball 48, thus reestablishing communication between the chamber 45 and passage 47. This communication serves the function of providing for the flow of fluid directly through the apparatus to take up play between the brake shoes and brake drums upon initial operation of the brake pedal, as described above, and also serves the second function of providing for the replenishing in the lines 18 and wheel cylinders 17 of any leakage which may have occurred during brake application.

The operation of the modified form of the invention shown in Figure 2 is as follows:

Depression of the brake pedal 15 displaces fluid through the line 14 into the chamber 56, and then through passages 69, bore 60, passages 67 and 63 and line 64 into the brake cylinders to take up play between the brake shoes and brake drums. This flow of fluid is possible because of the normal unseating of the needle valve 65, as previously stated. As soon as the brake shoes have been engaged with the drums, there will be an immediate increase in hydraulic pressure throughout the system. Since the effective area of the piston 54 (corresponding to the cross-sectional area of the bore 52) is greater than that of the stationary plunger 58, the piston 54 then moves toward the right as viewed in Figure 2. The valve 65 will almost immediately close and the collar 66 will be moved from engagement with its shoulder in the passage 63, and communication between the chamber 62 and chamber 56 will be cut off. Movement of the piston 54 will result in displacing fluid from the chamber 62 through passage 63 into the brake lines to increase the braking pressure. The effective area of the piston 54 being greater than the cross-sectional area of the stationary plunger 68, the resulting pressures in the brake cylinders will be substantailly greater than the pressures generated in the master cylinder. Assuming that the effective area of the piston 54 is twice the cross-sectional area of the chamber 62, and disregarding relatively small spring resistances and friction, the boosted hydraulic pressure ratio will be 2:1 as in the form of the invention previously described.

Without the addition of the motor mechanism, the amount of fluid required to be displaced from the master cylinder to effect a given movement of the piston 54 would be twice the amount of fluid displaced into the brake cylinders, and this would be wholly impracticable. The piston 53 follows up with respect to the piston 54 in the same manner that the power piston in Figure 1 follows up with respect to the piston 6. Movement of the piston 54 moves the rod 70 to the right to transmit movement to the operating lever 74 which will fulcrum at its lower end as viewed in Figure 2. The ends of the lever 77 will exert pressure on the balls 78 and 79 and since the spring 80 is lighter than the spring 84, the ball 79 will be seated first, whereupon further movement of the lever 74 will result in unseating the ball 78.

The seating of the ball 79 disconnects the motor chambers 81 and 82, and the unseating of the ball 78 admits higher pressure into the chamber 81 to move the piston 72, and consequently the piston 53, toward the right. Thus it will be apparent that the piston 53 moves at the same time and to the same extent as the piston 54. Assuming, as previously stated, that the effective area of the piston 54 is twice the area of the stationary plunger 58, and assuming that the cross-sectional area of the plunger 58 is equal to the cross-sectional area of the bore 51 minus the cross-sectional area of the portion of the rod 70 passing through the seal 90, the amount of fluid displaced from the master cylinder will equal the amount of fluid displaced into the brake lines from the chamber 62, the follow-up action of the piston 53 causing the chamber 56 to expand its volume at a rate corresponding to the contraction in the volume of the chamber 62 as the piston 54 moves toward the right. Thus, as in the previous form of the invention, the modified form shown in Figure 2 provides for a substantially boosted hydraulic pressure in the brake lines without increasing the amount of fluid which must be displaced from the master cylinder.

As soon as movement of the piston 54 stops, operation of the valve controlling lever 74 will be reversed, thus seating the valve 78 and, if necessary to restore the proper relative pressures in the chambers 81 and 82, the valve 79 will be "cracked" to exhaust air from the chamber 81 into the chamber 82. A perfect follow-up action of the power piston 53 relative to the piston 54 will be provided.

In connection with the modified form of the invention, particular attention is invited to the fact that it is highly desirable in a booster brake unit of this general type to provide as fast a response of the motor as possible when the brake pedal is actuated to eliminate any drag in the operation of the motor relative to pedal operation. It has been proposed to accomplish this through a mechanism employing a lever extending diametrically across the motor piston and having its opposite ends connected to suitable valves of the general types of the valves 78 and 79. Assuming that the lever arms in such case are equal, any given movement of the center of the lever will be multiplied by two at either end of the lever, thus providing a faster motor response than has been heretofore possible. The valve operating mechanism in Figure 2 goes even further in providing a far greater speed of response of the motor. Assuming that the ends of the lever 74 are equal in length, any movement transmitted to the lever by the rod 70 will be multiplied by two at the pivot point 77'. If the lever arms of the lever 77 are equal, any movement of the pivot point 77' would be doubled at either end of the lever 77, thus resulting in operation of the valve elements at a speed four times the speed of operation of the rod 70, the degree of movement of the valves being similarly multiplied. In the type of valve mechanism wherein opposite ends of the lever 74 operated respective valves, the 2:1 valve operating ratio is relatively unchangeable. In the present device, it not only is possible to secure a 4:1 ratio of valve operation, but an even greater speed ratio easily may be secured merely by decreasing the distance between the fulcrumed lower end of the lever 74 in Figure 2 from the axis of the rod 70. Thus any desired ratio or valve operation may be obtained, and this ratio functions both in the energizing of the motor and in cutting off the energization of the motor. Thus for all practical purposes it may be assumed that the response of the motor piston 72 to operation of the brake pedal 15 is instantaneous.

Upon retractile movement of the brake pedal 15, pressure in the chamber 56 is relieved and the existing pressure in the chamber 62 moves piston 54 toward the left, assisted by the spring 59, thus causing the lever arm 74 to swing in the same direction to first release the ball 78 to be seated, and then completely and rapidly open the ball valve 79 to connect the motor chambers 81 and 82 to balance the pressures in the motor. The spring 59 will continue movement of the parts to the "off" positions and near the end of the retractile stroke of the piston 54, the needle valve 65 will be unseated by the collar 66 to connect the chambers 56 and 62. As in the case of the ball 48 in Figure 1, the opening of the valve 65 permits play to be taken up between the brake shoes and drums prior to operation of the piston 54, and serves the second function of providing for the replenishing of any fluid which may have leaked from the high pressure portion of the system during brake application.

It will be noted that the present invention is capable of substantially different embodiments. For example, in Figure 1 two chambers, 10 and 45, are in communication with the master cylinder whereas only one chamber 56, communicates with the master cylinder in the structure shown in Figure 2. Moreover, in Figure 1, two pistons or piston structures namely, the piston 7 and its seal 8, and the piston 6 and its seal 8, are subject to direct pressure from the master cylinder. In Figure 2, only one piston structure, namely, the piston 54 and its seal 55, are directly subjected to master cylinder pressures in order to apply the brakes. Furthermore, a part of the piston 6, namely, its seal 8, displaces fluid from the high pressure chamber in Figure 1 into the master cylinder whereas the interior surfaces of the piston 54 form the fluid displacing means for applying high pressure to the brakes in Figure 2. It is understood, therefore, that where the expression "chamber means" is employed in the claims, this expression refers to the chambers 10 and 45 in Figure 1 and to the chamber 56 in Figure 2. Where the expression "piston means" occurs in the claims, such expression has reference in Figure 1 to the piston 6, subjected to pressure in the chamber 45 and the seal 8 of the piston 7, subjected to pressure in the cylinder 10. In Figure 2, the expression "piston means" applies to the left hand facing portions of the piston 54 and to the similarly facing portions of the seal 55. Where the expression "fluid displacing device" is employed in the claims, this expression applies to the seal 8 of the piston 6 in Figure 1 and to the left hand end wall of the bore 60 of the piston 54 in Figure 2.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. In a hydraulic braking system having a master cylinder operated by the operator and wheel cylinders to apply the brakes, a hydraulic compounding device having chamber means communicating with the master cylinder and piston means therein subject to pressure of the fluid from the master cylinder, said compounding device having a high pressure chamber communicating with the wheel cylinders and a fluid displacing device movable with said piston means to displace fluid from said high pressure chamber to the wheel cylinders, the total area of the piston means subjected to fluid pressure from the master cylinder being substantially greater than the area of said fluid displacing device which is effective for displacing fluid from said high pressure chamber, and power means responsive to operation of said piston means for tending to reduce the capacity of said chamber means to minimize the quantity of fluid from the master cylinder necessary to effect a given movement of said piston means.

2. In a hydraulic braking system having a master cylinder operated by the operator and wheel cylinders to apply the brakes, a hydraulic compounding device having chamber means communicating with the master cylinder and piston means therein subject to pressure of the fluid from the master cylinder, said compounding device having a high pressure chamber communicating with the wheel cylinders and a fluid displacing device movable with said piston means to displace fluid from said high pressure chamber to the wheel cylinders, the total area of the piston means subjected to fluid pressure from the master cylinder being substantially greater than the area of said fluid displacing device which is effective for displacing fluid from said high pressure chamber, a motor, a piston in said chamber means operable by said motor upon energization thereof to tend to reduce the capacity of said chamber means to minimize the quantity of fluid from the master cylinder necessary to effect a given movement of said piston means, and follow-up means for controlling said motor in accordance with movements of said piston means.

3. In a hydraulic braking system having a master cylinder operated by the operator and wheel cylinders to apply the brakes, a hydraulic compounding device comprising a body having cylinder means therein and piston means reciprocable in said cylinder means, said cylinder means being connected to the master cylinder, said body having a high pressure chamber therein communicating with the wheel cylinders, fluid displacing means forming a part of said piston means and movable therewith to displace fluid from said chamber into the wheel cylinders, the total area of the piston means subjected to pressure of the fluid from the master cylinder being substantially greater than the area of said fluid displacing means which is effective for displacing fluid from said chamber, and a motor device carried by said body coaxial with said piston means and responsive to movements of said piston means for tending to reduce the capacity of said cylinder means to minimize the quantity of fluid from the master cylinder necessary for effecting a given movement of said piston means.

4. In a hydraulic braking system having a master cylinder operated by the operator and wheel cylinders to apply the brakes, a hydraulic compounding device comprising a body having cylinder means therein and piston means reciprocable in said cylinder means, said cylinder means being connected to the master cylinder, said body having a high pressure chamber therein communicating with the wheel cylinders, fluid displacing means forming a part of said piston means and movable therewith to displace fluid from said chamber into the wheel cylinders, the total area of the piston means subjected to pressure of the fluid from the master cylinder being substantially greater than the area of said fluid displacing means which is effective for displacing fluid from said chamber, a motor carried by said body and having a piston coaxial with and movable into said cylinder means, said piston being movable to tend to decrease the capacity of said cylinder means upon energization of said motor to minimize the quantity of fluid from the master cylinder necessary to effect a given movement of said piston means, and follow-up means for controlling operation of said motor and its piston in accordance with movements of said piston means.

5. In a hydraulic braking system having a master cylinder operated by the operator and wheel cylinders to apply the brakes, a hydraulic compounding device comprising a body having a pair of separated alined cylinders, connected fluid operable pistons in said cylinders, one of said cylinders at one side of the piston thereof and the other cylinder at the corresponding side of the piston thereof being in constant communication with the master cylinder, the other end of said other cylinder forming a pressure chamber communicating with the wheel cylinders, check valve controlled means providing for the flow of fluid from the first named end of said other cylinder to the wheel cylinders but preventing reverse flow of said fluid after initial movement of said pistons from their "off" positions, and motor means controlled by movement of said pistons from their "off" positions for tending to reduce the capacity of the end of one of said cylinders which communicates with the master cylinder to minimize the amount of fluid from the master cylinder necessary to effect a given movement of said pistons.

6. In a hydraulic braking system having a master cylinder operated by the operator and wheel cylinders to apply the brakes, a hydraulic compounding device comprising a body having a pair of separated alined cylinders, connected fluid operable pistons in said cylinders, one of said cylinders at one side of the piston thereof and the other cylinder at the corresponding side of the piston thereof being in constant communication with the master cylinder, the other end of said other cylinder forming a pressure chamber communicating with the wheel cylinders, check valve controlled means providing for the flow of fluid from the first named end of said other cylinder to the wheel cylinders but preventing reverse flow of said fluid after initial movement of said pistons from their "off" positions, a motor having a piston alined with and mounted in the first named end of said other cylinder and movable thereinto to tend to reduce the capacity thereof upon energization of said motor, and follow-up control means for said motor to energize the latter to effect movement of the motor piston to an extent approximately equal to any given movement of said fluid operable pistons.

7. Apparatus constructed in accordance with claim 6 wherein said motor is carried by one end of said body and said fluid-operable pistons are carried by a tubular piston rod having one end slidable through said motor piston and its other end open to the atmosphere, a valve normally engaging the first named end of said piston rod to close the opening therethrough, said motor piston being recessed to form a pair of chambers communicating with the respective ends of said motor and provided therebetween with a seat engageable with said valve, said valve being normally held from said seat by engagement of the first named piston rod therewith, and a source of elastic fluid pressure connected to one end of said motor.

8. In a hydraulic braking system having a master cylinder operated by the operator and wheel cylinders to apply the brakes, a hydraulic compounding device comprising a body having a relatively large bore in one end and a smaller bore in the other end, a tubular plunger coaxial with and fixed to the first named end of said body, a hollow piston having an annular portion slidable between said relatively large bore and said tubular plunger and having a reduced end loosely extending into said smaller bore, said smaller bore and the adjacent end of said relatively large bore communicating with the master cylinder and the interior of said tubular plunger communicating with the wheel cylinders, means normally affording communication between said smaller bore and the interior of said tubular plunger and operable to close such communication upon initial movement of said piston, and motor-operated means responsive to movement of said piston for tending to reduce the capacity of said smaller bore.

9. Apparatus constructed in accordance with claim 8 wherein said hollow piston is provided with a passage communicating between its interior and said smaller bore, the means for controlling communication between said smaller bore and the interior of said hollow piston comprising a valve for closing said passage, said valve having a portion engageable with said tubular plunger to be held thereby in open position when said piston is in its "off" position.

10. In a hydraulic braking system having a master cylinder operated by the operator and wheel cylinders to apply the brakes, a hydraulic compounding device comprising a body having a relatively large bore in one end and a smaller bore in the other end, a tubular plunger coaxial with and fixed to the first named end of said body, a hollow piston having an annular portion slidable between said relatively large bore and said tubular plunger and having a reduced end loosely extending into said smaller bore, said smaller bore and the adjacent end of said relatively large bore communicating with the master cylinder and the interior of said tubular plunger communicating with the wheel cylinders, means normally affording communication between said smaller bore and the interior of said tubular plunger and operable to close such communication upon initial movement of said piston, a motor, a piston carried thereby and operable in said smaller bore, said motor piston being movable by said motor to tend to reduce the capacity of said smaller bore upon energization of said motor, and follow-up control means for energizing said motor in accordance with movements of said hollow piston.

WILLIAM STELZER.